(12) United States Patent
Illy et al.

(10) Patent No.: US 6,821,544 B1
(45) Date of Patent: Nov. 23, 2004

(54) METHOD OF MANUFACTURING A CHEESE OR MILK PRODUCT BY MOLDING

(75) Inventors: Bernard Illy, Ponthevrard (FR); Pascal Couraud, Hanches (FR); Bernard Fromage, Chevreuse (FR)

(73) Assignee: Bongrain S.A., Viroflay Cedex (FR)

( * ) Notice: Subject to any disclaimer, the term of this patent is extended or adjusted under 35 U.S.C. 154(b) by 49 days.

(21) Appl. No.: 09/678,996

(22) Filed: Oct. 4, 2000

(30) Foreign Application Priority Data

Oct. 8, 1999 (FR) .......................................... 99 12551

(51) Int. Cl.⁷ ................................................ A23C 19/00
(52) U.S. Cl. ...................... 426/582; 426/89; 426/134; 426/512; 426/580
(58) Field of Search ........................... 426/89, 91, 130, 426/134, 512, 580, 582

(56) References Cited

U.S. PATENT DOCUMENTS 1,718,997 A * 7/1929 Burt ........................... 426/134
4,948,613 A    8/1990 Bernard et al.

FOREIGN PATENT DOCUMENTS

| EP | 0159632 | * 10/1985 |
| EP | 0 811 664 | 12/1997 |
| FR | 2 099 014 | 3/1972 |
| FR | 2 206 055 | 6/1974 |
| FR | 2 532 525 | 3/1984 |

OTHER PUBLICATIONS

Winton, The Structure and Composition of Foods, vol. III, 1937, New York, NY, pp. 178–180 and 207.*

* cited by examiner

Primary Examiner—Leslie Wong
(74) Attorney, Agent, or Firm—Alston & Bird LLP

(57) ABSTRACT

The invention relates to a method of molding a cheese or milk product, wherein the method comprises:
 a) casting a melt of said product into at least one mold;
 b) cooling to cause at least a peripheral layer of the melt to congeal;
 c) reheating the mold(s) to soften a surface region of said peripheral layer; and
 d) unmolding the product.

19 Claims, 1 Drawing Sheet

METHOD OF MANUFACTURING A CHEESE OR MILK PRODUCT BY MOLDING

The present invention relates to a method of manufacturing a cheese or milk product by molding.

BACKGROUND OF THE INVENTION

There exist various methods that are used for making cheese or milk products.

One of those methods consists in casting hot melted cheese into molds of aluminum or injected or thermoformed plastic. Under such circumstances, the mold also serves as final packaging for the consumer. That method does not enable the product to be coated after it has been cast.

There also exist methods of molding milk products or cheese in recyclable molds, in which case the products ready for unmolding need to be sufficiently firm to enable them to be extracted by mechanical pressure or by vibration, or indeed by blowing air. Those methods generally require the use of unmolding agents.

In order to manufacture a product which is provided with a stick for holding it, suggestions have been made to cast the hot melt into a thermoformed plastics shell having the stick placed therein prior to casting. Furthermore, since sealing is provided by the stick coming into contact with the shell, it is necessary for the stick to be very simple and cylindrical or prismatic in shape. In addition, as mentioned above, in that kind of technique, the product cannot be coated.

Suggestions have also been made to make products by extrusion with a stick being put into place before or after slicing. That method is suitable only for making products having a two-dimensional shape that is the result of the profile of the die used and of the slicing system.

There also exist shaping methods in which the material is pressed into a mold, after which the product is ejected by mechanical pressure or by blowing air.

That method is usable only for milk or cheese products having texture that is strongly cohesive and elastic, and it is unsuitable for textures having little cohesion (creamy or crumbly).

OBJECTS AND SUMMARY OF THE INVENTION

The present invention seeks to provide a method enabling products to be made with a desired shape, and which is particularly suitable for textures that are not mechanically strong (creamy or crumbly) e.g. a processed cheese of fondant texture.

To this end, the invention provides a method of molding a cheese or milk product, wherein the method comprises:

a) casting a melt of said product into at least one mold;

b) cooling to cause at least a peripheral layer of the melt to congeal;

c) reheating the mold(s) to soften a surface region of said peripheral layer; and d) unmolding the product.

Advantageously, the method includes a step, after casting a) and preferably during cooling b), of putting into place a stick for holding the product.

After unmolding d), the method can include coating e) the product.

In particular, this coating can be performed by dipping, in particular by dipping in a bath whose temperature lies in the range 20° C. to 90° C.

It is particularly advantageous for the coating of the product to be accompanied by projecting solid pieces of size lying in the range 1 mm to 4 mm, for example, which pieces become fixed to the coating.

By way of example, the solid pieces may be selected from dried fruit and/or dehydrated fruit and/or vegetables and/or spices and/or flavoring.

Preferably, the coating is made out of a material, in particular one that gels or is solid when cold, which does not adhere to a material for packaging the product, such as a plastics tray.

The method may implement a step after the unmolding d), and where appropriate after the coating e), of packaging the product under a modified atmosphere.

The casting may be performed into at least one recyclable mold, and at a temperature of at least 50° C.

Said cooling b) may be performed in a brine whose temperature lies in the range −10° C. to −40° C.

The cooling b) may be performed in such a manner that the temperature of the product, at least in said congealed peripheral layer, lies the range −4° C. to −20° C.

The reheating c) may be performed by dipping in water at a temperature lying in the range 15° C. to 60° C.

During unmolding, the temperature of the product, at least in the portion of the peripheral layer that remains congealed, advantageously lies in the range −2° C. to −18° C.

In a preferred implementation, the casting a) is performed in a plurality of stages so as to make a product built up of a plurality of layers and/or a product having a filling.

The invention also provides a soft cheese or milk product made by molding and presenting a dry extract content lying in the range 25% to 50%, fat content in the dry extract lying in the range 30% to 75% by weight, and a pH preferably lying in the range 4.8 to 6, which product may include a coating that imparts mechanical strength and/or non-stick properties to the product when in packaging such as a tray.

BRIEF DESCRIPTION OF THE DRAWINGS

Other characteristics and advantages of the invention will appear better on reading the following description given by way of non-limiting example and with reference to the drawing, in which.

MORE DETAILED DESCRIPTION

Figure 1:
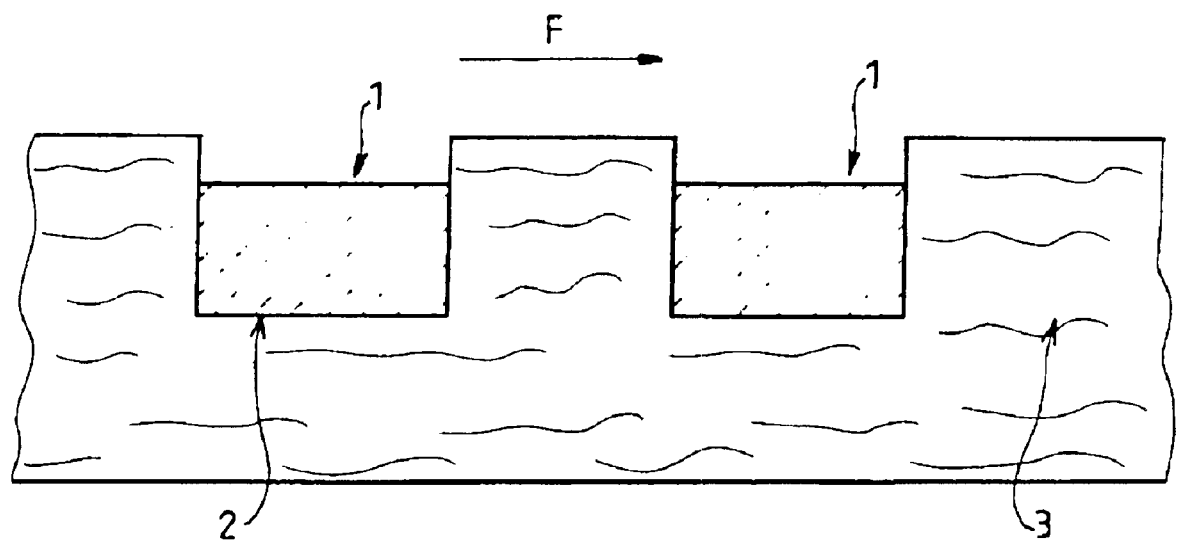
FIG. 1 is a diagram representing the operation of casting and cooling the melt.
Figure 2A:
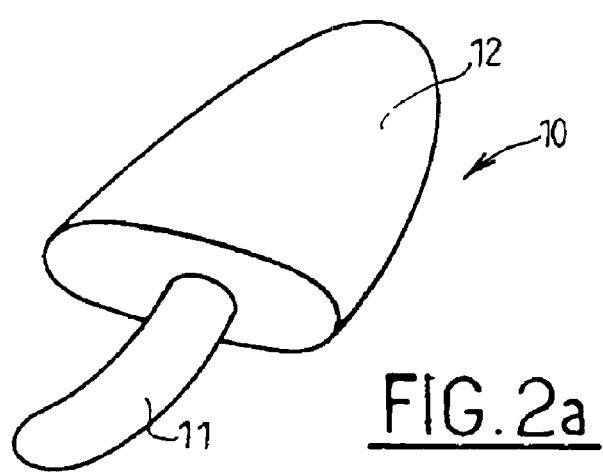
FIGS. 2a and 2b are respectively a perspective view and a section view of a product of the invention.
Figure 2B:
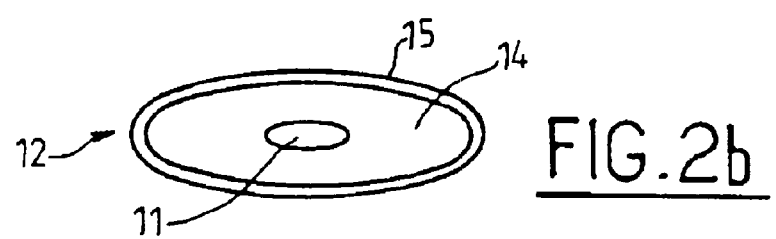

The invention applies to any soft or processed cheese that can be cast while hot, and more generally to any cheese or milk product, in particular of creamy texture, that can be cast while hot.

A melt is initially prepared in a bowl with a stirrer, with stirring time lying, for example, in the range 4 minutes (min) to 30 min at a temperature greater than 75° C. Thereafter, the melt is cast into molds 2, e.g. molds made of stainless steel or plastics material, so as to form individual products 1 of weight lying, for example, in the range 5 grams (g) to 200 g. While casting is taking place, the temperature of the melt remains greater than about 50° C.

The molds 2 containing the melt are then cooled, e.g. in a food-grade brine bath at a temperature lying in the range −10° C. to −40° C. so as to cause the product to congeal at least in part around its periphery at a temperature lying in the range −4° C. to −20° C. This cooling operation advantageously lasts for less than 3 min, e.g. in the range 2 min to 3 min, at least for products that are provided with a stick 11 for holding, with the stick being put into place during this cooling step at a moment that is selected so that the viscosity of the solidifying material is sufficient to hold in place a stick that is inserted vertically.

Thereafter, the molds 2 are re-heated by being dipped in water at a temperature lying in the range about 15° C. to 60° C., thereby enabling the surface of the product to remelt and allowing the product to be unmolded while nevertheless ensuring that it remains rigid because there still remains at least a surface layer, e.g. having a thickness of at least a few millimeters that remains congealed, e.g. at a temperature lying in the range −2° C. to −18° C., thereby preventing any sticking or deformation of the product while it is being unmolded.

A coating can then be applied to the product, in particular by dipping it in a coating bath at a temperature lying in the range about 20° C. to 90° C. Contact between the hot coating material and the cold surface of the product causes the coating material to solidify immediately or almost immediately.

The coating 15 surrounding the core 14 of the individual products 12, optionally fitted with their sticks 11 for holding, can itself be of a nature that is different from the nature of the coated product, for example a milk-based fat, a vegetable fat, or an optionally sweeted gel preparation.

A particular use for the coating is that it subsequently holds together the core 14, and also provides it with a visual appearance, while the product is being stored in a non-congealed state, in particular at a temperature lying in the range 2° C. to 8° C. (normal temperatures for storing fresh non-frozen milk products).

In addition, on eating the product, the consumer perceives contrast between the coating 15 which is harder and the core which is creamy or crumbly, for example, thereby producing an organoleptic sensation that is agreeable.

The stick 11 can be deposited continuously in the product 1 during the cooling stage. The stick can be made of wood or of plastic and it can also serve as a medium for promotional material. It enables the consumer to take hold of the product in hygienic manner.

It should also be observed that the coating 15, e.g. a gelled material, serves to prevent the product from sticking to its packaging, generally a tray of plastics material.

Making the coating 15 by means of a hot dip also enables small pieces to be fixed to the surface of the product, e.g. pieces of a size lying in the range 1 millimeter (mm) to 4 mm and blown onto the products, for example. These small pieces can be dried fruit and/or dehydrated fruit and/or vegetables and/or spices and flavoring. They serve to give the product an original appearance and to influence its organoleptic properties.

The method enables products to be made in a variety of three-dimensional shapes, with or without a stick, and that would be difficult to make using traditional methods.

In particular, the product of the invention is advantageous when using substances that are not cohesive, being of a fondant texture, e.g. processed cheeses or substances with little intrinsic strength.

The invention applies in particular to soft or processed cheese that can be cast when hot, having a dry extract lying in the range 25% to 50%, and a fat content in the dry extract lying in the range 30% to 75% by weight, and pH lying in the range 4.8 to 6.

The invention makes it possible, in particular for substances having high water content (greater than or equal to 50% by weight) to make molded products while avoiding the need to use an unmolding agent, and to do so even for textures that are creamy and sticky.

Another advantage of the invention is that the products can have low gel content since the method does not require such additives co be used to reinforce the mechanical properties of the core substance.

EXAMPLE 1

A processed soft cheese having 42% dry extract, 68% by weight fat in the dry extract, and a pH of about 5.6, was made using fresh curds, milk proteins, emulsifying salts, and texturing agent.

Heating was performed at 90° C. The melt was then cast at a temperature lying in the range 75° C. to 80° C. into recyclable molds of stainless steel and of rounded shape which were dipped in calcium chloride brine at a temperature lying in the range −20° C. to −40° C. The cheese began to cool at 60° C. to 65° C. and a plastic stick representing a promotional character was inserted automatically. In less than 3 minutes, the melt had congealed completely or in part at a temperature lying in the range −7° C. to −15° C. The mold was then warmed by water at 20° C. and the periphery of the product softened instantly or quasi-instantly, thereby enabling the product to be extracted from its mold.

The product was then coated by being dipped at 85° C. in a milk-based preparation having 28% by weight dry extract (fresh curds, milk proteins, emulsifying salts, thickening agent).

Contact between the hot coating and the cold surface of the product caused the coated material to solidify immediately. The presence of a thickening agent allowed the coating to gel, thereby imparting mechanical strength thereto and also non-stick properties relative to the packaging for the product. The thickness of the coating obtained in this way lay in the range 0.5 mm to 2 mm, for example. The product was then transported and packaged in a thermoformed plastics cell sealed with a membrane and containing a protective atmosphere. The product was suitable for storage at a temperature lying in the range 2° C. to 8° C. The product had a creamy texture and a taste of fresh cream.

EXAMPLE II

A processed cheese was made having 46% dry extract, 50% by weight of fat in the dry extract, and a pH of about 5.6, using Emmenthal, Gouda, Cheddar, or Maasdam, milk proteins, butter, emulsifying salts, and whey powder.

The product was then coated by being dipped in a milk preparation at 85° C. having 28% by weight dry extract (pressed cheese, butter, milk proteins, and texturing agent).

Thereafter the method was identical to that of Example I (solidifying the coating, gelling, etc.).

EXAMPLE III

A sweet processed cheese preparation was made having 45% dry extract, 60% by weight fat in the and a ph of about 5.6, using fresh curds, milk protein, sugar, fruit flavoring and pulp, emulsifying salts, and texturing agents.

Thereafter the method was identical to that of Example I.

What is claimed is:

1. A method of molding a cheese or non-frozen milk product, wherein the method comprises:

a) casting a melt of said product having a dry exact content lying in the range 25% to 50%, and a fat content by weight in the dry extact lying in the range 30% 75%, into at least one mold;

b) cooling the melt to cause only a peripheral layer of the melt to congeal;

c) reheating the mold(s) to soften a surface region of said congealed peripheral layer; and d) unmolding the product.

2. A method according to claim 1, including a step, after casting (a) and preferably during cooling (b), of putting into place a stick for holding the product.

3. A method according to claim 1, including, after the unmolding step d), a step e) of coating the product.

4. A method according to claim 3, wherein said coating step e) is performed by dipping.

5. A method according to claim 4, wherein the dipping is performed by using a bath whose temperature lies in the range 20° C. to 90° C.

6. A method according to claim 3, wherein the coating of the product is accompanied by projecting solid pieces of size lying in the range 1 mm to 4 mm, which pieces become fixed to the coating.

7. A method according to claim 6, wherein the solid pieces are selected from dried fruit and/or dehydrated fruit and/or vegetables and/or spices and/or flavoring.

8. A method according to claim 3, wherein the coating is made out of a material which does not adhere to a material for packaging the product.

9. A method according to claim 1, including a step after the unmolding d) of packaging the product under a modified atmosphere.

10. A method according to claim 1, wherein the casting is performed into at least one recyclable mold, and at a temperature of at least 50° C.

11. A method according to claim 1, wherein said cooling (b) is performed in a brine whose temperature lies in the range −10° C. to 40° C.

12. A method according to claim 1, wherein the cooling (b) is performed in such a manner that the temperature of the product, at least in said congealed d peripheral layer, lies in the range −4° C. to −20° C.

13. A method according to claim 11, wherein the duration of the cooling is less than 3 minutes.

14. A method according to claim 1, wherein the rehealing (c) is performed by dipping in water at a temperature lying in the range 15° C. to 60° C.

15. A method according to claim 1, wherein during unmolding, the temperature of the product, at least in the portion of the peripheral layer that remains congealed, lies in the range of −2° C. to −1° C.

16. A method according to claim 1, wherein the casting (a) is performed in a plurality of stages so as to make a product built up of a plurality of layers and/or a product having a filling.

17. A method according to claim 1, wherein said product bas a pH that lies in the range 4.8 to 6.

18. A method of making a molded cheese product, which comprises:

a) casting a melt of said product having a dry extract content lying in the range 25% to 50%, and a fat content by weight in the dry extract lying in the range 30% to 75%, into at least one mold;

b) cooling the melt contained in the mold to cause at least a peripheral layer of the melt to congeal;

c) reheating the mold to soften a surface region of said congealed peripheral layer, d) unmolding the product from the mold, e) coating the unmolded product with a coating material that solidifies upon contact with the product to form a hardened coating surrounding a core of said product, and f) storing the coated product with said core in a non-congealed state and with said coating holding the core together.

19. A method according to claim 18 wherein the step of storing the coated product comprises storing the product at a temperature in the range of 2° C. to 8° C.

* * * * *